United States Patent
Mancuso et al.

(10) Patent No.: US 6,175,657 B1
(45) Date of Patent: Jan. 16, 2001

(54) ADAPTIVE INTRAFIELD REDUCING OF GAUSSIAN NOISE BY FUZZY LOGIC PROCESSING

(75) Inventors: Massimo Mancuso, Monza; Viviana D'Alto, Milan; Daniele Sirtori, Cerveteri; Rinaldo Poluzzi, Milan, all of (IT)

(73) Assignee: SGS-Thomson Microelectronics S.r.l., Agrate Brianza (IT)

(*) Notice: Under 35 U.S.C. 154(b), the term of this patent shall be extended for 0 days.

(21) Appl. No.: 09/073,236

(22) Filed: May 7, 1998

(30) Foreign Application Priority Data

May 12, 1997 (EP) .................................................. 97830217

(51) Int. Cl.[7] .................................................. G06K 9/40
(52) U.S. Cl. .......................................... 382/261; 382/254
(58) Field of Search .................................. 382/260–269, 382/254

(56) References Cited

U.S. PATENT DOCUMENTS

| | | | |
|---|---|---|---|
| 5,680,179 | * 10/1997 | D'Alto et al. | 348/607 |
| 5,748,796 | * 5/1998 | Pennino et al. | 382/254 |
| 5,757,977 | * 5/1998 | Mancuso et al. | 382/260 |

FOREIGN PATENT DOCUMENTS

| | | | |
|---|---|---|---|
| 0 415 648 A2 | 8/1990 | (EP) | G06F/15/66 |
| 0 698 990 A1 | 8/1994 | (EP) | H04N/1/00 |

OTHER PUBLICATIONS

Shen, Q., "Fuzzy Intraframe Smoothing of a Noisy Image," Electronics Letters, vol. 26, No. 13, Jun. 21, 1990, pp. 908–910.

* cited by examiner

Primary Examiner—Thomas D. Lee
Assistant Examiner—Stephen Brinich
(74) Attorney, Agent, or Firm—Theodore E. Galanthay; Allen, Dyer, Doppelt, Milbrath & Gilchrist, P.A.

(57) ABSTRACT

The level of Gaussian noise in a memory field being scanned by rows is reduced by reconstructing each pixel by fuzzy logic processors. The processors process the values of pixels neighboring the pixel being processed and belonging to a processing window defined by the last scanned row and the row being scanned, thus minimizing the memory requirement of the filtering system to a single row. The system performs an adaptive filtering within the current field itself and does not produce "edge-smoothing" effects as in prior adaptive filtering systems operating on consecutive fields.

14 Claims, 3 Drawing Sheets

ADAPTIVE INTRAFIELD REDUCING OF GAUSSIAN NOISE BY FUZZY LOGIC PROCESSING

FIELD OF THE INVENTION

The present invention relates to an adaptive filtering system to reduce the level of Gaussian noise in a memory field being scanned by rows. More particularly, the system of the invention is adapted to reduce the noise of an image to be displayed on a display screen by implementing an adaptivity in response to brightness changes, according to a predefined sensorial response system.

BACKGROUND OF THE INVENTION

Noise is inherent to any communication system and, in television broadcasting networks, originates in different ways. At the source of image, noise may be either generated by photon or thermal noise in a video camera or by granular noise in films of cameras. Signal processing circuits and recorder play back systems add noise because the signal circulates in an intrinsically noisy loop.

Finally, the signal may be carried to the transmitter via a distribution network that adds more noise, and broadcast via an intrinsically noisy transmission medium. The receiver circuits themselves add noise. Many techniques have been developed to reduce the problem of Gaussian noise and these are described in literature. The adaptivity of noise level to a certain image/video sequence is a key feature of the so-called "smart" filters.

Generally, this adaptivity is obtained using non-linear techniques, such as averaging filters or filters with variable behavior depending on the estimation of some parameters. For instance, many known filters are obtained using scale and position estimates, or by estimating the temporal correlation (Recursive Averaging Filters) which is the most common techniques presently used in TV environments.

These known techniques have intrinsic disadvantages and/or limitations. In the case of a video sequence strongly affected by noise, the filter may confuse the noise with motion effects resulting in a poor noise reduction effect. To improve this situation, the user could automatically select from among a set of preordered response characteristics, such as to dynamically accentuate or reduce the filtering effect. However, these systems of arbitrary selection influence the temporal frequency, introducing a sort of "comet effect" which may become more annoying than an excessive edge smoothing. On the other hand, motion detection requires at least one field memory in the recursive loop of the filter with the consequent increment of total memory requirement for the system.

SUMMARY OF THE INVENTION

It is an object of the present invention to provide a Gaussian noise filtering system that minimizes the memory requirement for noise filtering and that introduces an adaptivity to the local picture characteristics based on the sensorial response to brightness changes of the so-called Human Visual System without penalizing edge definition by an undue smoothing. The filtering system of the invention provides for an effective response to these important requirements by processing data relative exclusively to a certain memory field, thus minimizing the memory requirement. The essential characteristic of the system of the invention is the utilization of a fuzzy logic process which allows for a current definition of the adaptivity parameters bearing in mind the characteristics of a certain scheme of sensorial response, such as, for example, the scheme of response to brightness changes known as the Human Visual System (HVS). The method of the invention reduces the noise affecting a certain area of a field scanned by rows, without employing information determined from a preceding field or picture which, in contrast, is the classic approach of the known systems wherein the noisy pixel is substituted with an averaged pixel value of the nearby ones belonging to a certain processing window. This known approach has the serious disadvantage of smoothing the edges and the contours of the objects thereby depressing image definition.

In contrast, according to the present invention, each noisy pixel singled out within a certain processing window, is substituted with a weighted average of the surrounding pixels. This is done according to a preestablished degree of similarity between the same pixel to be substituted and each of the nearby ones.

In this manner, if $K_i$ provides a measure of the degree of similarity between the pixel X to be filtered and a generic pixel $X_i$ belonging to the process window, the output filtered pixel value is given by:

$$X(i)_{out} = K_i * X + (1-K_i) * X_i \quad (1)$$

If $K_i$ is equal to 0, X and $X_i$ are equal and thereby X may be substituted with $X_i$. Contrarily, if $K_i$ is equal to 1, X and $X_i$ are radically different from each other and in this situation their exchange would introduce a serious error. Therefore, according to the present invention, the filter output is obtained through a superimposition of the effects of several elementary filters whose function is described by equation (1), and such that the output pixel is expressed by the following relationship:

$$X_{out} = \Sigma X(i)_{out} = [\Sigma K_i * X + (1-K_i) * X_i] \quad (2)$$

wherein X represents the value relative to the gray level of the pixel being processed; and $X_i$ represents the value relative to the gray level of a pixel of neighboring the pixel under processing. $K_i$ provides the measure of similarity between the pixel X and the adjacent pixel $X_i$, in practice $K_i$ represents the value produced by a fuzzy logic processing block according to a membership function corresponding to the sentence "the difference between the pixels is low". N is the number of neighboring pixels considered.

DETAILED DESCRIPTION OF THE PREFERRED EMBODIMENTS

Figure 1:
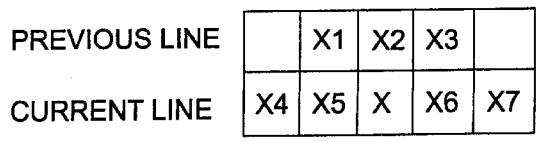
FIG. 1 shows a processing window used in accordance with the present invention.

Let us consider a processing window as the one shown in FIG. 1, with X the pixel to be processed. The pixels X1, X2, X3 are the pixels of a scan line preceding the current scan line, to which the pixel to be processed belongs, and neighboring the pixel X. Pixels X4, X5, X6 and X7 represent neighboring pixels of the pixel $X_i$ belonging to the current scan line. According to a fundamental aspect of the invention the system must preliminarily carry out an estimation of the noise level. For this purpose, the system computes the absolute values of the differences $D_i$ between the pixel to be filtered, X, and the neighboring ones, $X_i$, and finds the maximum difference $D_{max}$ and the minimum difference $D_{min}$ among the absolute values of the computed differences $D_i$.

Using fuzzy logic processing, different membership functions can be found that fulfill the sentence: "the absolute difference value $|D_i|$ is small", but if, by hypothesis, the produced value $K_i$ varies according to the following law:

$$K_i = \frac{D_{max}}{D_{max} - D_{min}} - \frac{|d_i|}{D_{max} - D_{min}} \quad (3)$$

several drawbacks would arise:
i) if the processing window does not contain edges, or boundaries of objects or features, $D_{max}$ and $D_{min}$ will be exclusively correlated to the noise, which therefore would not be significantly reduced;
ii) on the contrary, if the processing window contains edges or boundaries, these would be unduly smoothed because of a certain loss of edge information.

To avert the above mentioned drawbacks, a membership function based on the estimation of the noise level is implemented. If the filter processing window coincides with a relatively homogeneous area of a picture, all the differences $D_i$ will be close in terms of their absolute value and correlated to the noise. Thus, it is possible to select a membership function that is able to generate threshold parameters Th1 and Th2 that substantially coincide with $D_{max}$.

On the contrary, in case the pixel to be filtered belongs to an edge or boundary region of the image, the filtering action is made significant only where the differences among the pixels of the processing windows are small, that is to say, within the interval of the differences $|D_i|$ defined by $[D_{min}; (D_{min}+D_{max})/2]$.

The threshold parameters Th1 and Th2 are then computed according to the following equations:

$$Th1 = K_n * D_{max} + (1 - K_n) * D_{min} \quad (4)$$

$$Th2 = K_n * D_{max} + (1 - K_n) * \frac{D_{max} + D_{min}}{2} \quad (5)$$

It is easy to demonstrate that Th1 is always greater or equal to Th2. The range of the fuzzy variable "Low" may then be defined in terms of $D_{max}$, $D_{min}$, and $K_n$, where $K_n$ influences the filter behavior according to the noise level determined for the area of the image defined by the processing window.

As far as $K_n$ is concerned, in case the pixel to be processed belongs to a relatively homogeneous region of a picture affected by noise, $D_{max}$ and $D_{min}$ will be mainly correlated to the noise content and will have not so different values. In other words, this means that the difference $(D_{max}-D_{min})$ is relatively small.

Figure 2:
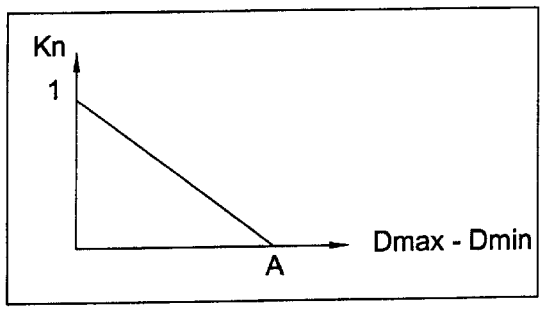
FIG. 2 is an example of the membership function used to weigh the computed differences between the pixel under processing and the neighboring pixels within the processing window of FIG. 1.

If the pixel X to be processed belongs to an edge or boundary line, the difference $(D_{max}-D_{min})$ will be large. Hence, the value of $K_n$ is obtained, according to the method of the invention, by using a weighted function of the type depicted in FIG. 2.

The parameter A depends on the brightness of the pixel to be processed. For example, it can be established on:

$$A=x/\lambda \quad (6a)$$

$$A=(255-x)/\lambda \quad (6b)$$

By way of an example, a satisfactory value for $\lambda$ may be 4.

In choosing the parameter A for equation (6a), a standard scheme of sensorial response to contrast as the so-called Human Visual System (HVS) may be taken into consideration. According to Weber's law, equal increments on the logarithm scale of pixel luminance value are perceived to be equally different from one another therefore:

$$\Delta(log) \Delta C \quad (7)$$

wherein $\Delta C$ represents the contrast variation. This means that:

$$\Delta x/x=\alpha \quad (8)$$

where $\alpha$ is a constant. Hence, when an edge region is encountered, the condition $\Delta x > \alpha x$ is complied with.

While Weber's law is generally used to detect the minimum gray level to be quantized without introducing any false contour effect, according to the method of this invention, Weber's law is used instead to modulate the filtering action as a function of the luminance characteristics of the pixel being processed. If the parameter A is chosen according to the relationship (6b), a stronger filtering action is implemented in dark areas than in bright areas of the image, if compared to that which would be obtained by using equation (6a). This is in consideration of the fact that the human eye is more sensitive to variations due to Gaussian noise in dark areas than in bright areas.

DESCRIPTION OF THE ARCHITECTURE OF THE INVENTION

Figure 4:
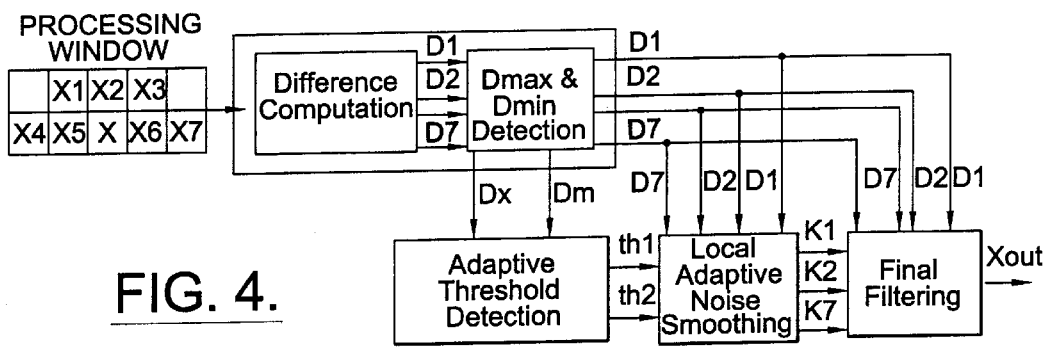
FIG. 4 is a basic scheme of a Gaussian noise filtering system according to the present invention.

A functional block diagram of a system implementing the above described technique is illustrated in FIG. 4. After "constructing" the required processing window according to common buffering techniques, which involves information relative to the pixels belonging to at least two successive scanning lines or rows, a dedicated DIFFERENCE COMPUTATION circuit computes the differences $D_i$ (D1, D2 ..., D7) between the pixel luminance values (X1, X2, ..., X7) of the processing window neighboring the pixel X being processed.

The block, $D_{max}$ & $D_{min}$ DETECTION, identifies and selects by making them available through two dedicated outputs, the maximum and minimum values of the differences $D_i$ input to the block. A first fuzzy logic Adaptive Threshold Detection processing block receives as inputs the pair of values $D_{max}$ and $D_{min}$ of the current set of differences $D_i$ and computes the parameter $K_n$ according to the following function referred to as MEMBERSHIP 1, shown in FIG. 2 and expressed by:

$$\text{if } x > A \text{ then } K_n = 0$$
$$\text{if } 0 \leq x \leq A \text{ then } 1 - (x/A)$$

generating a corresponding pair of threshold values Th1 and Th2, according to equations (4) and (5), respectively.

Figure 3:
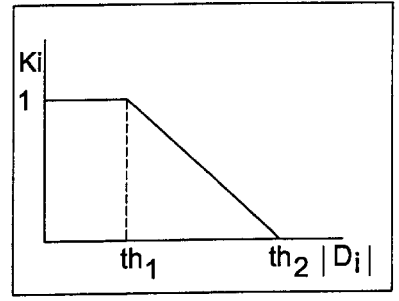
FIG. 3 depicts a suitable membership function for generating the processing coefficients of a weighted average in accordance with the invention.

A second fuzzy logic LOCAL ADAPTIVE NOISE SMOOTHING processing block carries out the independent processing of each of the differences $D_i$. This is done using the previously generated threshold parameters Th1 and Th2 according to the function referred to as MEMBERSHIP 2, which may be depicted as done in FIG. 3, and defined by:

$$\text{if } |D_i| < Th1 \text{ then } K_i = 1$$
$$\text{if } |D_i| > Th2 \text{ then } K_i = 0$$
$$\text{if } Th1 \leq |D_i| \leq Th2 \text{ then } K_i = \frac{|D_i|}{Th2 - Th1} - \frac{Th2}{Th2 - Th1}$$

producing a set of output values $K_i$, each representing the measure of the degree of similarity between the pixel to be filtered, X, and a respective neighboring pixel $X_i$ and inside the processing window, according to equation (3).

Figure 5:
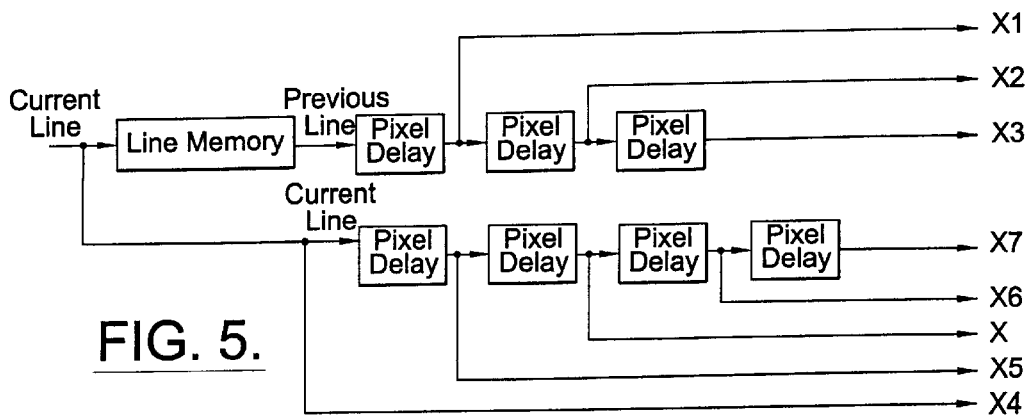
FIG. 5 shows a block diagram of a circuit for defining a certain processing window in accordance with the invention.
Figure 6:
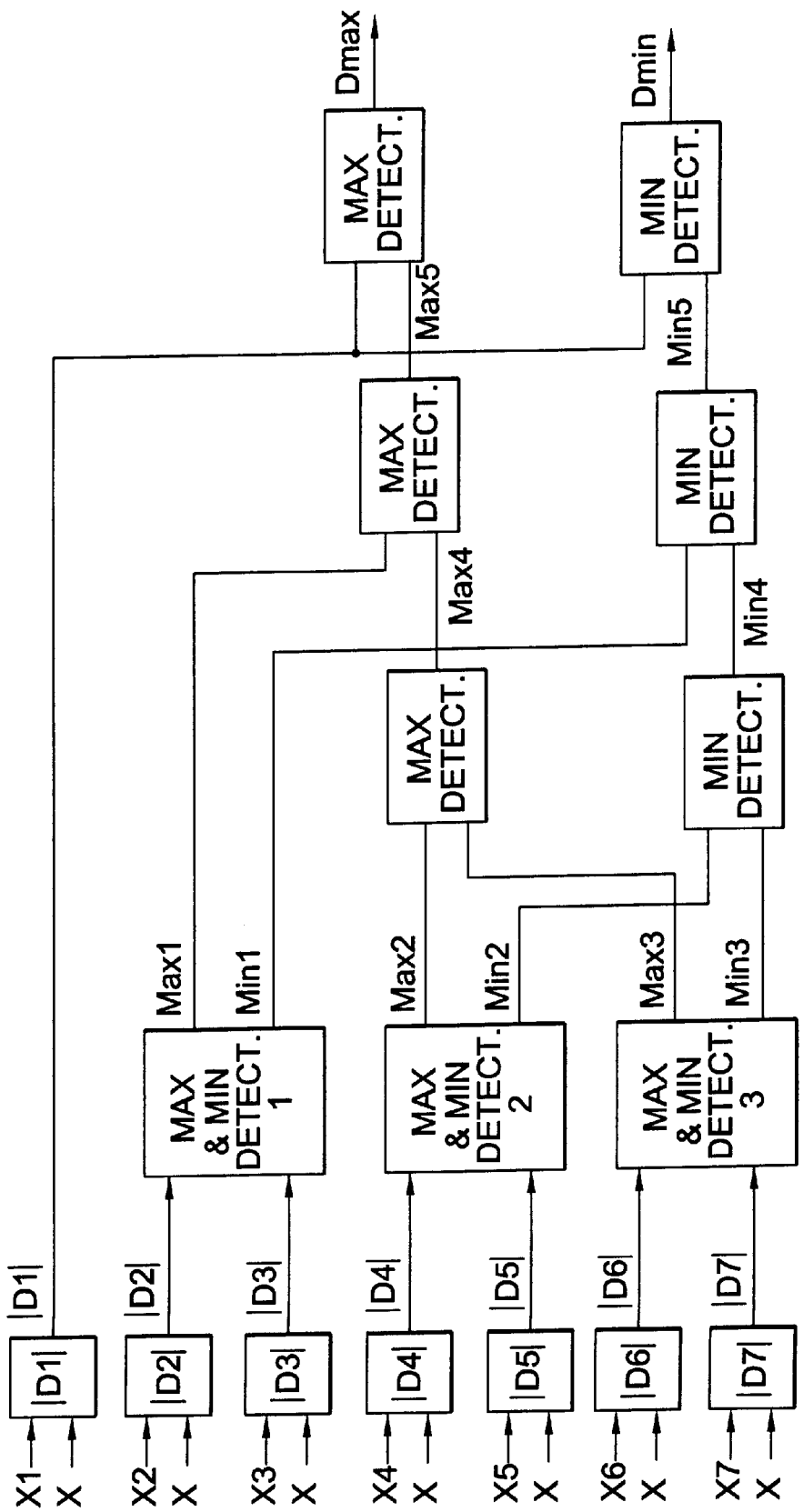
FIG. 6 is a diagram of the computation blocks of the absolute values of the differences and extraction of the minimum difference and of the maximum difference in accordance with the invention.

A final filtering block separately processes each of the difference values $D_i$ as a function of the respective weighing coefficient $K_i$ and, through a final adder stage $\Sigma$, produces the $X_{out}$ pixel as the sum of the weighted contributions, according to equation (2). The processing window can be easily realized by a circuit such as that shown in FIG. 5, whose functioning will be readily appreciated by those skilled in the art.

It is evident that the memory requirement is substantially limited to the information of a simple scan line or row (Line Memory), and, therefore, it is a minimum fraction if compared to the memory requirement needed to store a whole field or picture.

Figure 7:
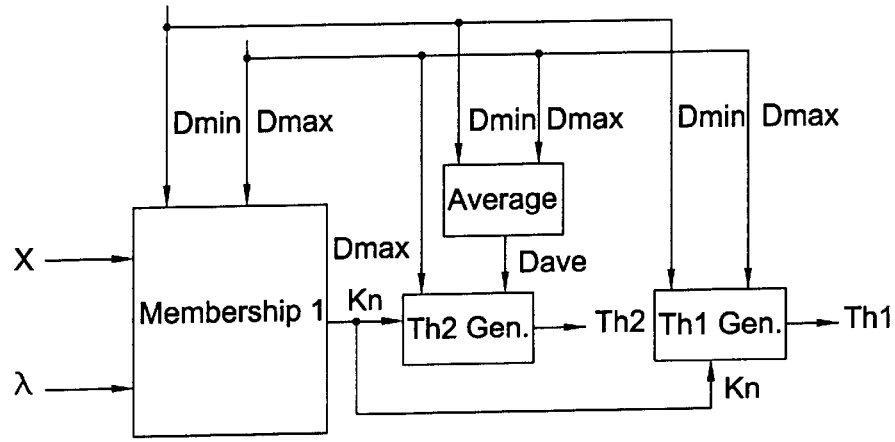
FIG. 7 is a functional diagram of the fuzzy logic processing block of the pixel being processed and of the minimum and maximum differences to generate a pair of adaptive threshold values in accordance with the invention.

A functional diagram of the block DIFFERENCE COMPUTATION and $D_{MAX}$ & $D_{MIN}$ DETECTION is illustrated in FIG. (6) and will be readily appreciated by those skilled in the art. The ADAPTIVE THRESHOLD DETECTION block is schematically detailed in FIG. 7.

According to a preferred embodiment, a fuzzy logic processing block according to a certain membership function (MEMBERSHIP 1), receives as inputs the difference values $D_{min}$ and $D_{max}$, the value of the pixel under processing and a certain parameter $\lambda$. The block outputs a value $K_n$ which, applied to the threshold generating blocks TH1 Gen and TH2 Gen, conditions the generated threshold values Th1 and Th2.

Figure 8:
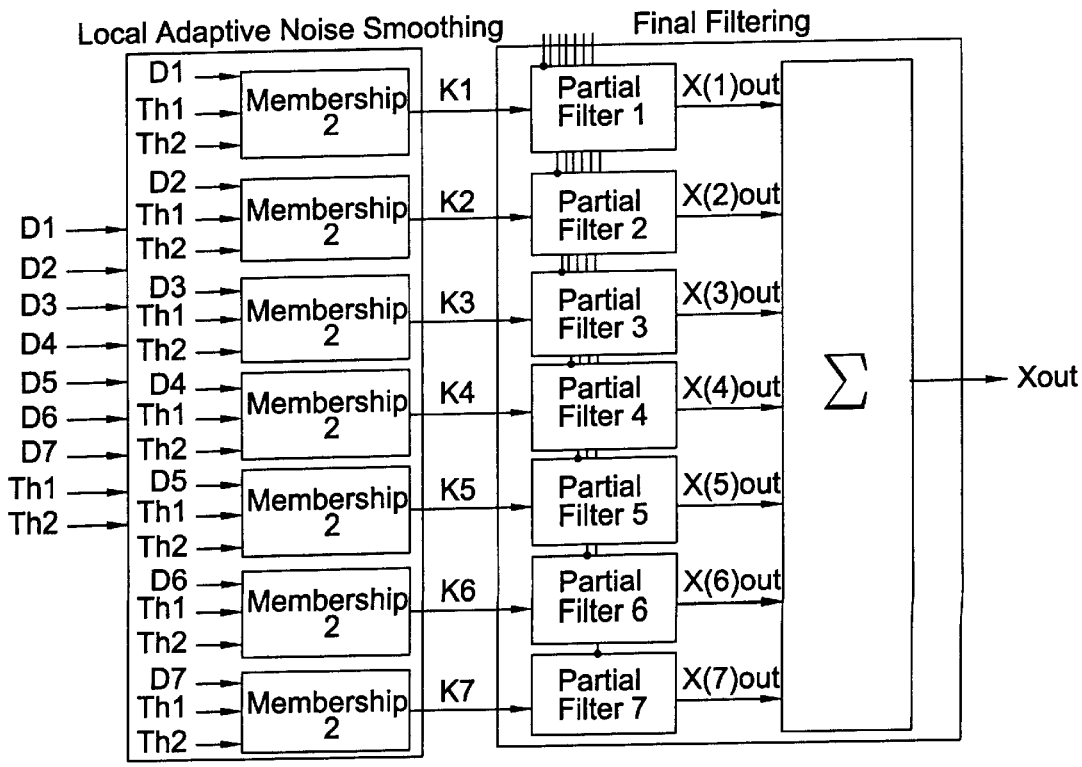
FIG. 8 is a functional diagram of the plurality of fuzzy logic processing blocks of each computed difference to generate a set of weighted coefficients that affect an identical number of elementary filters, and of the adder block regenerating the output pixel value in accordance with the invention.

Structural details of the LOCAL ADAPTIVE NOISE SMOOTHING and FINAL FILTERING block are shown in the functional diagram of FIG. 8. The plurality of fuzzy logic circuits (MEMBERSHIP 2), generate a set of weighting coefficients $K_i$, by processing each difference value according to the threshold pairs Th1 and Th2 previously generated by the circuit of FIG. 7. The membership function used may be the one depicted in FIG. 3.

The computation of the set of coefficients $K_i$ allows reducing the noise level through the FINAL FILTERING block by using a number of partial filters suitable to produce a corresponding set of weighted contributions $X(i)_{out}$ that are then added by the final adder $\Sigma$ which outputs the correct pixel $X_{out}$.

That which is claimed is:

1. A method of filtering Gaussian noise contained in a data stream relative to a predetermined field scanned by rows, the method comprising the steps of:

storing information of a preceding scanned row defining, together with the data of a row being currently scanned, a bidimensional processing window of a predetermined number of pixels;

computing differences between a value of a predetermined pixel of the row being scanned and values of adjacent pixels belonging in the processing window and determining a minimum and a maximum of the computed differences;

processing by fuzzy logic the values of the respective pixels of the minimum and maximum differences and of at least one parameter derived from a predetermined sensorial response according to a first membership function, and generating a first weighting coefficient;

generating a pair of threshold values of differences according to the first weighting coefficient;

processing by fuzzy logic each of computed differences and the pair of threshold values according to a second membership function, producing a corresponding set of weighting coefficients;

combining each of said computed differences with a respective one of the set of weighting coefficients; and adding the results of the combinations producing a corrected value of the predetermined pixel.

2. A method according to claim 1, wherein the step of generating the first weighting coefficient comprises generated same using a membership function defined by:

$$\text{if } x > A \text{ then } K_n = 0$$
$$\text{if } 0 < x < A \text{ then } K_n = 1 - (x/A),$$

wherein x is the value of the predetermined pixel, $K_n$ is the first weighting coefficient, and A is a processing parameter related to the brightness of the predetermined pixel to be processed.

3. A method according to claim 1, wherein the step of generating the pair of threshold values comprises generating same according to the following equations:

$$Th1 = K_n * D_{\max} + (1 - K_n) * D_{\min}$$

$$Th2 = K_n * D_{\max} + (1 - K_n) * \frac{D_{\max} + D_{\min}}{2}$$

wherein Th1 is the first threshold value, Th2 is the second threshold value, $K_n$ is the first weighting coefficient, $D_{min}$ is the minimum difference, and $D_{max}$ is the maximum difference.

4. A method according to claim 1, wherein the step of producing the set of weighting coefficients comprises producing same using a membership function defined by:

$$\text{if } |D_i| < Th1 \text{ then } K_i = 1$$
$$\text{if } |D_i| > Th2 \text{ then } K_i = 0$$
$$\text{if } Th1 \leq |D_i| \leq Th2 \text{ then } K_i = \frac{|D_i|}{Th2 - Th1} - \frac{Th2}{Th2 - Th1}$$

wherein Th1 is the first threshold value, Th2 is the second threshold value, $K_i$ is the weighting coefficient from the set of weighting coefficients, $D_{min}$ is the minimum difference, and $D_{max}$ is the maximum difference.

5. A method of filtering Gaussian noise contained in a data stream relative to a predetermined field scanned by rows, the method comprising the steps of:

storing information of a preceding scanned row defining, together with the data of a row being currently scanned, defining a bidimensional processing window of a predetermined number of pixels;

computing differences between a value of a predetermined pixel of the row being scanned and values of adjacent pixels belonging in the processing window and determining a minimum and a maximum of the computed differences;

processing by fuzzy logic the values of the respective pixels of the minimum and maximum differences and of at least one parameter derived from a predetermined sensorial response according to a first membership function, and generating a first weighting coefficient using a membership function defined by if $x>A$ then $K_n=0$ if $0<x<A$ then $K_n=1-(x/A)$, wherein x is the value of the predetermined pixel, $K_n$ is the first weighting coefficient, and A is a processing parameter related to the brightness of the predetermined pixel to be processed;

generating a pair of threshold values of differences according to the first weighting coefficient according to the following equations $$Th1 = K_n * D_{\max} + (1 - K_n) * D_{\min}$$

$$Th2 = K_n * D_{\max} + (1 - K_n) * \frac{D_{\max} + D_{\min}}{2}$$

wherein Th1 is the first threshold value, Th2 is the second threshold value, $K_n$ is the first weighting coefficient, $D_{min}$ is the minimum difference, and $D_{max}$ is the maximum difference;

processing by fuzzy logic each of computed differences and the pair of threshold values according to a second membership function, producing a corresponding set of weighting coefficients;

combining each of said computed differences with a respective one of the set of weighting coefficients; and adding the results of the combinations producing a corrected value of the predetermined pixel.

6. A method according to claim 5, wherein the step of producing the set of weighting coefficients comprises producing same using a membership function defined by:

if $|D_i| < Th1$ then $K_i = 1$ if $|D_i| > Th2$ then $K_i = 0$ if $Th1 \leq |D_i| \leq Th2$ then $K_i = \frac{|D_i|}{Th2 - Th1} - \frac{Th2}{Th2 - Th1}$ wherein Th1 is the first threshold value, Th2 is the second threshold value, $K_i$ is the weighting coefficient from the set of weighting coefficients, $D_{min}$ in is the minimum difference, and $D_{max}$ is the maximum difference.

7. A system for adaptive filtering to reduce Gaussian noise within a same field of an image, said system comprising:

buffering circuits of respective data sequences relative to a certain row of the field being scanned and to at least one previously scanned row of the same field defining a bidimensional processing window of pixels;

a circuit for computing the differences between the value of a predetermined pixel and adjacent pixels of the processing window and for determining the maximum and minimum computed differences;

a first fuzzy logic processor adaptively generating a pair of minimum and maximum threshold values of the computed differences based upon the value of the predetermined pixel, based upon the minimum and maximum difference, and based upon at least one parameter derived from a predefined sensorial response according to a first membership function;

a plurality of second fuzzy logic processors, each combining a respective difference with the pair of threshold values according to a second membership function and producing respective weighting coefficients;

a plurality of logic circuits, each modifying a respective difference value according to the respective weighting coefficients; and an adder circuit adding the modified values of the computed differences and outputting a corrected pixel value of the predetermined pixel.

8. A system according to claim 7, wherein said first fuzzy logic processor comprises means for generating the first weighting coefficient using a membership function defined by:

if $x>A$ then $K_n=0$ if $0<x<A$ then $K_n=1-(x/A)$, wherein x is the value of the predetermined pixel, $K_n$ is the first weighting coefficient, and A is a processing parameter related to the brightness of the predetermined pixel to be processed.

9. A system according to claim 7, wherein said first fuzzy logic processor comprises means for generating the pair of threshold values according to the following equations:

$$Th1 = K_n * D_{\max} + (1 - K_n) * D_{\min}$$

$$Th2 = K_n * D_{\max} + (1 - K_n) * \frac{D_{\max} + D_{\min}}{2}$$

wherein Th1 is the first threshold value, Th2 is the second threshold value, $K_n$ is the first weighting coefficient, $D_{min}$ is the minimum difference, and $D_{max}$ is the maximum difference.

10. A system according to claim 7, wherein the second fuzzy logic processors each comprise means for producing the weighting coefficients using a membership function defined by:

if $|D_i| < Th1$ then $K_i = 1$ if $|D_i| > Th2$ then $K_i = 0$ if $Th1 \leq |D_i| \leq Th2$ then $K_i = \frac{|D_i|}{Th2 - Th1} - \frac{Th2}{Th2 - Th1}$ wherein Th1 is the first threshold value, Th2 is the second threshold value, $K_i$ is the weighting coefficient from the set of weighting coefficients, $D_{min}$ is the minimum difference, and $D_{max}$ is the maximum difference.

11. A system for filtering Gaussian noise contained in a data stream relative to a predetermined field scanned by rows, the system comprising:

means for storing information of a preceding scanned row defining, together with the data of a row being currently scanned, a bidimensional processing window of a predetermined number of pixels;

means for computing differences between a value of a predetermined pixel of the row being scanned and values of adjacent pixels belonging in the processing window and determining a minimum and a maximum of the computed differences;

first means for processing by fuzzy logic the values of the respective pixels of the minimum and maximum differences and of at least one parameter derived from a predetermined sensorial response according to a first membership function, and for generating a first weighting coefficient;

means for generating a pair of threshold values of differences according to the first weighting coefficient;

second means for processing by fuzzy logic each of computed differences and the pair of threshold values according to a second membership function, producing a corresponding set of weighting coefficients;

means for combining each of said computed differences with a respective one of the set of weighting coefficients; and means for adding the results of the combinations producing a corrected value of the predetermined pixel.

12. A system according to claim 11, wherein said first means comprises for generating the first weighting coefficient using a membership function defined by:

if $x > A$ then $K_n = 0$ if $0 < x < A$ then $K_n = 1 - (x/A)$, wherein x is the value of the predetermined pixel, $K_n$ is the first weighting coefficient, and A is a processing parameter related to the brightness of the predetermined pixel to be processed.

13. A system according to claim 11, wherein the first means comprises means for generating the pair of threshold values according to the following equations $$Th1 = K_n * D_{max} + (1 - K_n) * D_{min}$$

$$Th2 = K_n * D_{max} + (1 - K_n) * \frac{D_{max} + D_{min}}{2}$$

wherein Th1 is the first threshold value, Th2 is the second threshold value, $K_n$ is the first weighting coefficient, $D_{min}$ is the minimum difference, and $D_{max}$ is the maximum difference.

14. A system according to claim 11, wherein the second means comprises means for producing the set of weighting coefficients using a membership function defined by:

if $|D_i| < Th1$ then $K_i = 1$ if $|D_i| > Th2$ then $K_i = 0$ if $Th1 \le |D_i| \le Th2$ then $K_i = \frac{|D_i|}{Th2 - Th1} - \frac{Th2}{Th2 - Th1}$ wherein Th1 is the first threshold value, Th2 is the second threshold value, $K_i$ is the weighting coefficient from the set of weighting coefficients, $D_{min}$ is the minimum difference, and $D_{max}$ is the maximum difference.

* * * * *

UNITED STATES PATENT AND TRADEMARK OFFICE
CERTIFICATE OF CORRECTION

PATENT NO. : US 6,175,657 B1
DATED : January 16, 2001
INVENTOR(S) : Massimo Mancuso, Viviana D'Alto, Daniele Sirtori, Rinaldo Poluzzi It is certified that error appears in the above-identified patent and that said Letters Patent is hereby corrected as shown below:

On the title page,
Inventors

Delete: "Viviana D'Alto, Milan;"
Insert: Viviana D'Alto, Milano;--

Cover Sheet,
Inventors

Delete: "Rinaldo Poluzzi, Milan,"
Insert -- Rinaldo Poluzzi, Milano, --

Column 1, Line 18

Delete: "At the source of image,"
Insert -- At the source of an image,"--

Column 1, Line 38

Delete: "common techniques"
Insert -- common technique --

Column 4, Line 30

Delete: "$\Delta(\log)\ \Delta C$"

Insert -- $\Delta(\log) \propto \Delta C$ --

Signed and Sealed this

Twenty-ninth Day of May, 2001

*Attest:*

NICHOLAS P. GODICI

*Attesting Officer*     *Acting Director of the United States Patent and Trademark Office*